(12) United States Patent
Khullar

(10) Patent No.: US 11,379,218 B2
(45) Date of Patent: Jul. 5, 2022

(54) DIFFERENTIATING BETWEEN HARD AND SOFT DEPENDENCIES IN SOFTWARE OBJECTS

(71) Applicant: SAP SE, Walldorf (DE)

(72) Inventor: Vipul Khullar, Walldorf (DE)

(73) Assignee: SAP SE, Walldorf (DE)

( * ) Notice: Subject to any disclaimer, the term of this patent is extended or adjusted under 35 U.S.C. 154(b) by 6 days.

(21) Appl. No.: 15/931,752

(22) Filed: May 14, 2020

(65) Prior Publication Data

US 2021/0311727 A1 Oct. 7, 2021

(30) Foreign Application Priority Data

Apr. 1, 2020 (IN) .............................. 202011014506

(51) Int. Cl.
*G06F 8/71* (2018.01)
*G06K 9/62* (2022.01)
*G06F 8/41* (2018.01)

(52) U.S. Cl.
CPC ................ *G06F 8/71* (2013.01); *G06F 8/433* (2013.01); *G06K 9/6267* (2013.01)

(58) Field of Classification Search
None
See application file for complete search history.

(56) References Cited

U.S. PATENT DOCUMENTS

| | | | |
|---|---|---|---|
| 4,558,413 A * | 12/1985 | Schmidt | G06F 8/71 |
| | | | 707/999.203 |
| 7,559,048 B1 * | 7/2009 | Bedell | G06F 16/289 |
| | | | 717/122 |
| 7,680,818 B1 * | 3/2010 | Fan | G06F 16/20 |
| | | | 707/999.103 |
| 7,966,346 B1 * | 6/2011 | Jameson | G06F 8/71 |
| | | | 707/625 |
| 8,689,179 B2 * | 4/2014 | Remmel | G06F 8/72 |
| | | | 717/110 |
| 8,762,929 B2 * | 6/2014 | Driesen | G06F 11/0718 |
| | | | 171/104 |
| 2010/0070797 A1 * | 3/2010 | Kaisermayr | G06F 11/0793 |
| | | | 714/E11.023 |
| 2011/0225126 A1 * | 9/2011 | Daniels | G06F 16/94 |
| | | | 707/690 |

(Continued)

OTHER PUBLICATIONS

Snoeck, "Existence Dependency: The Key to Semantic Integrity Between Structural and Behavioral Aspects of Object Types", 1998, IEEE (Year: 1998).*

*Primary Examiner* — Hossain M Morshed

(74) *Attorney, Agent, or Firm* — Mintz Levin Cohn Ferris Glovsky and Popeo, P.C.

(57) ABSTRACT

Data is received at a source system and characterizing a modified first software object for transport to a destination system via a request and to update a first software object deployed on the destination system. A first dependency of the modified first software object on a second software object is determined by the source system. An inconsistency between the modified first software object and the second software object is identified by the source system and using the first dependency. Data indicative of the inconsistency is provided. Related apparatus, systems, techniques and articles are also described.

16 Claims, 18 Drawing Sheets

(56) References Cited

U.S. PATENT DOCUMENTS

| | | | |
|---|---|---|---|
| 2012/0159421 A1* | 6/2012 | Driesen | G06F 11/0754 717/101 |
| 2019/0278862 A1* | 9/2019 | Kapoor | G06F 16/2282 |
| 2021/0311727 A1* | 10/2021 | Khullar | G06F 8/433 |

* cited by examiner

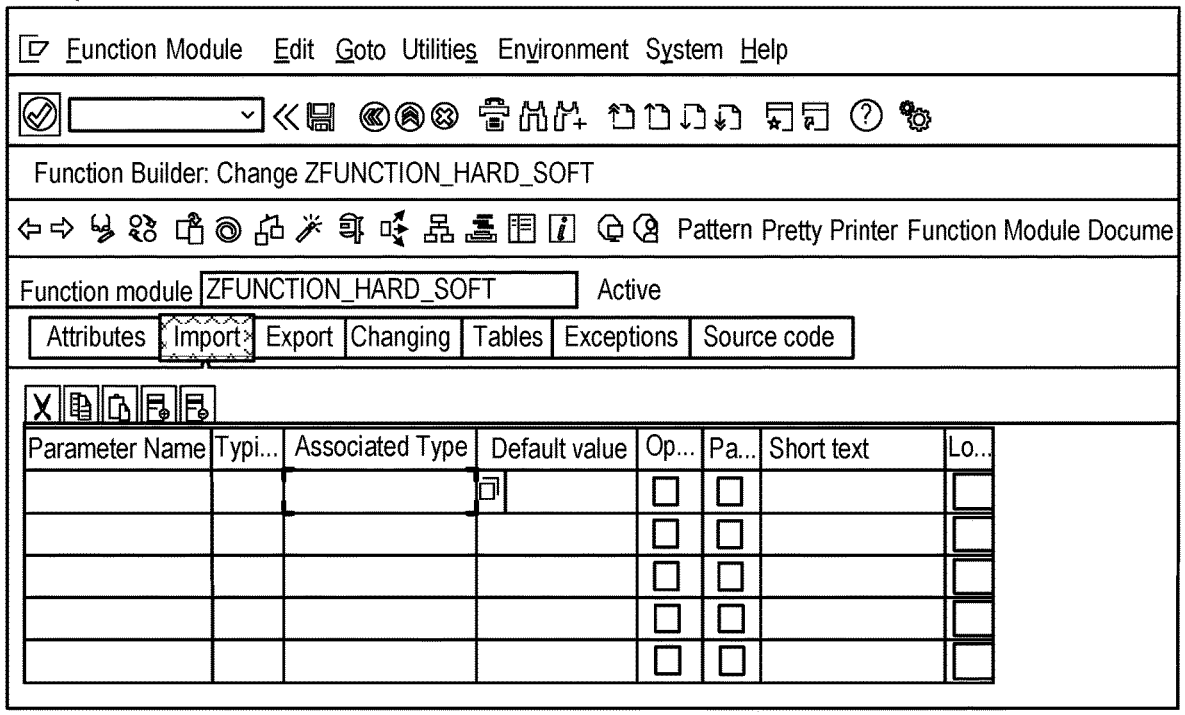
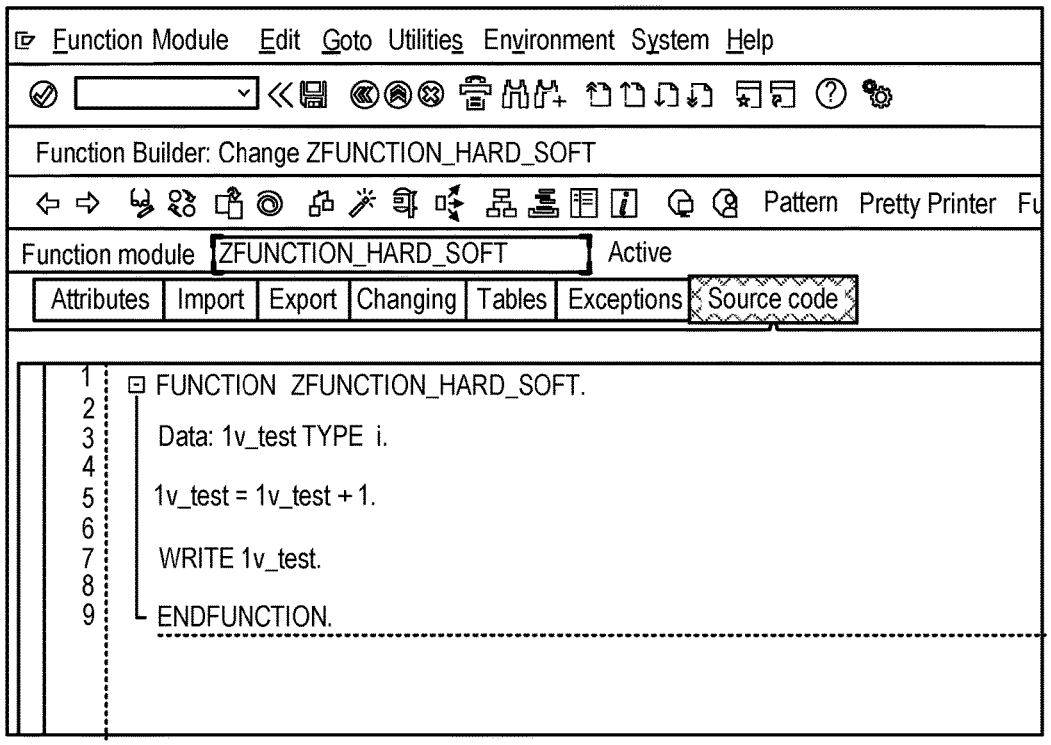
FIG. 1B

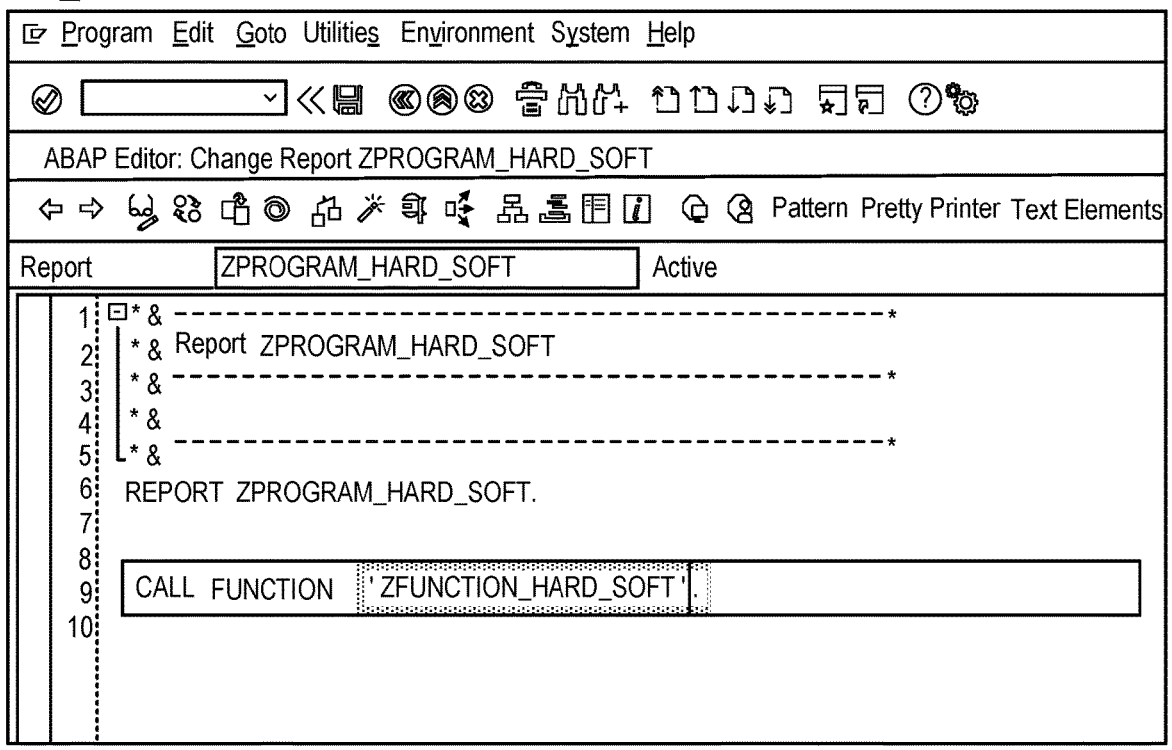
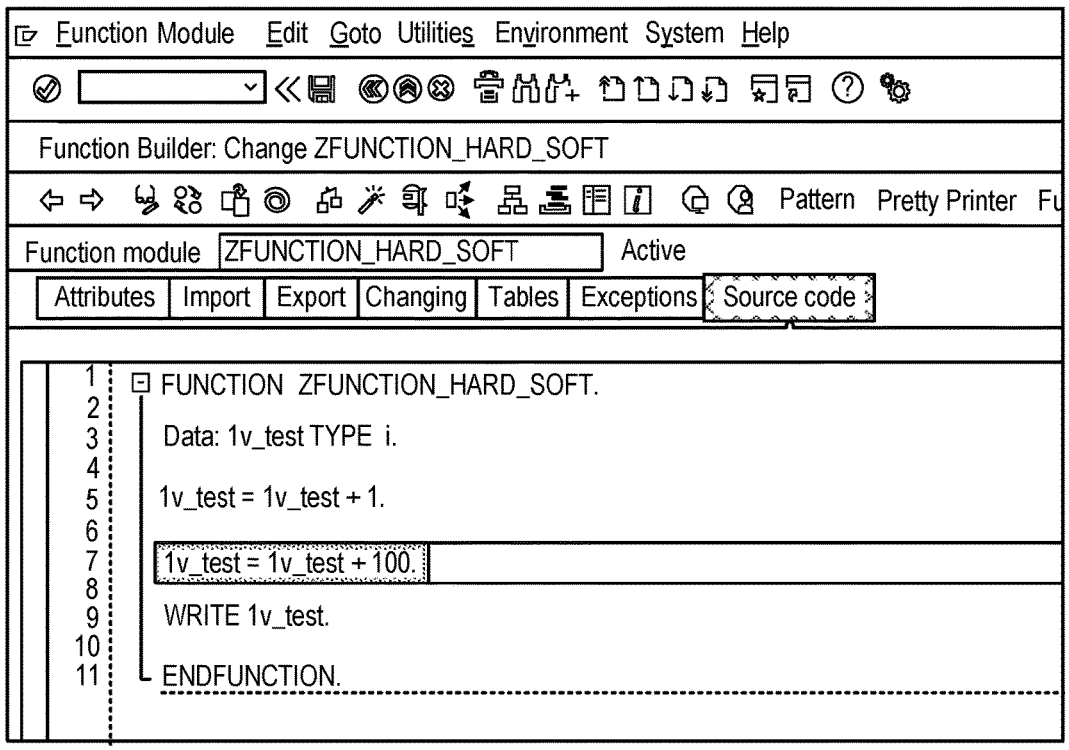
FIG. 2

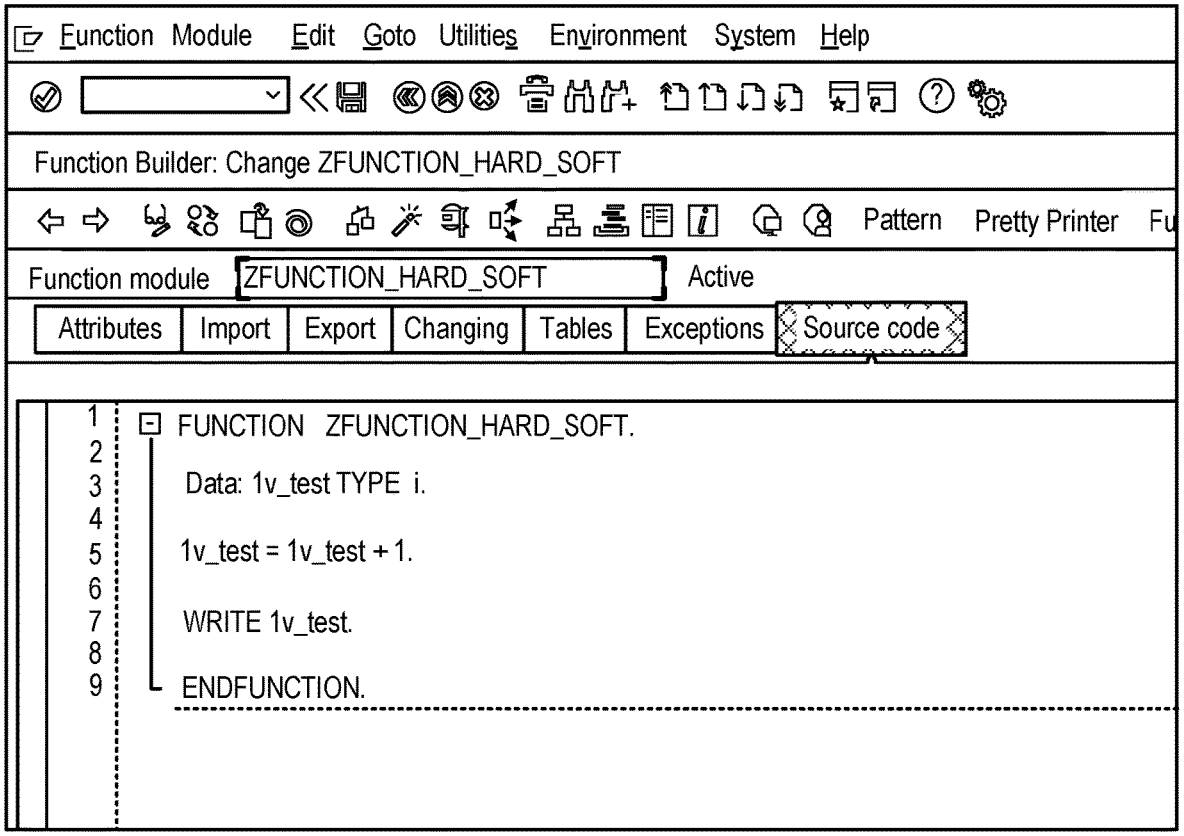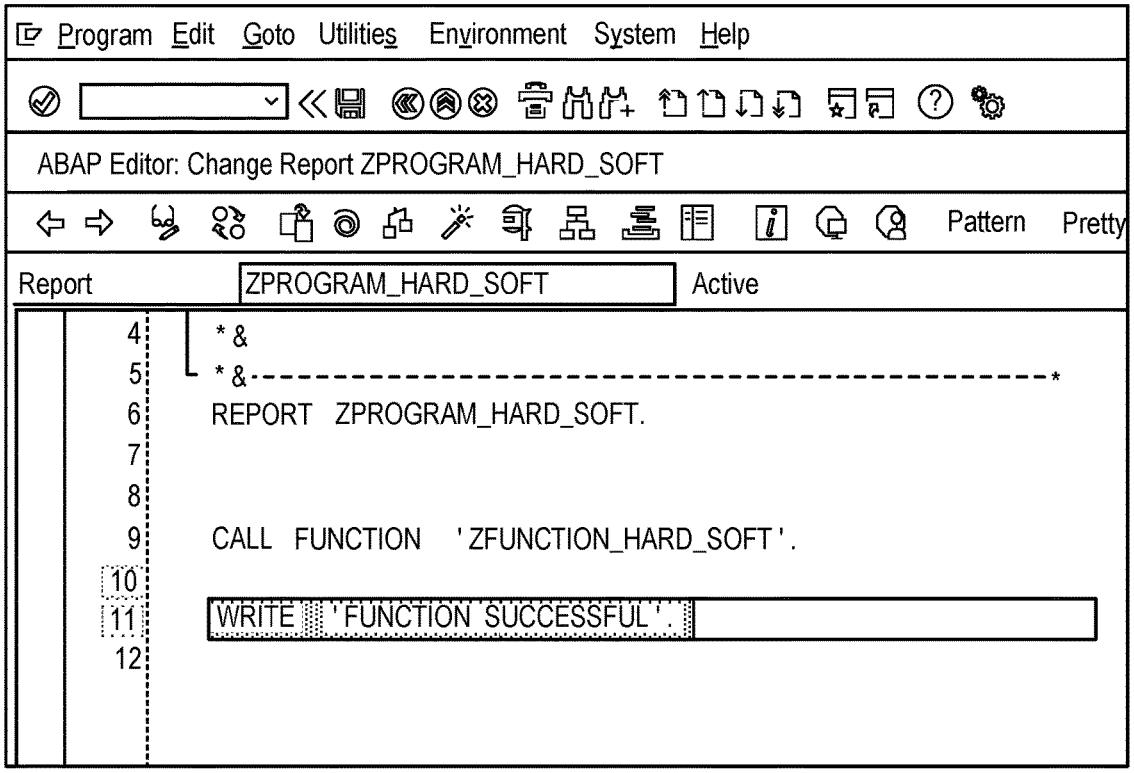
FIG. 4

FIG. 5B

```
ABAP Editor: Change Report ZPROGRAM_HARD_SOFT

Report   ZPROGRAM_HARD_SOFT        Active

4  *&
 5  *&----------------------------------------
 6  REPORT  zprogram_hard_soft.
 7
 8
 9  CALL  FUNCTION   'ZFUNCTION_HARD_SOFT'
10       EXPORTING
11         iv_num = 5.
```

FIG. 5C

```
Program  Edit  Goto  Utilities  Environment  System  Help

ABAP Editor: Change Report ZPROGRAM_HARD_SOFT

Report   ZPROGRAM_HARD_SOFT        Active (Revised)

2  *&  Report  ZPROGRAM_HARD_SOFT
 3  *&
 4  *&
 5  *&----------------------------------------
 6  REPORT  zprogram_hard_soft.
 7
 8
 9  CALL  FUNCTION   'ZPROGRAM_HARD_SOFT'
10       EXPORTING
11         iv_num = 5.
12 ▶
```

1  Syntax Error for Program ZPROGRAM_HARD_SOFT

| Ty... | Line | Description |
|---|---|---|
| ● | 13 | Program ZPROGRAM_HARD_SOFT |
|  |  | Formal parameter "IV_NUM" does not exist. exist. |

FIG. 9

Function Builder: Display ZFUNCTION_HARD_SOFT

Function module: ZFUNCTION_HARD_SOFT    Active

Attributes | Import | Export | Changing | Tables | Exceptions | Source code

Classification

Function Group: ZFG_TEST1    TEST1

Short Text: Test Hard Soft

Processing Type

- ◉ Regular Function Module
- ○ Remote-Enabled Module    ☐ BasXML supported
- ○ Update Module
  - ◉ Start immed.
  - ○ Immediate start (not updateable)
  - ○ Start Delayed
  - ○ Coll.run

General Data

| Person Responsible | KHULLAR |
| Last Changed By | KHULLAR |
| Changed on | 29.01.2020 |
| Package | $TMP |
| Program Name | SAPLZFG_TEST1 |
| Include Name | LZFG_TEST1U01 |
| Original Language | EN |

Not released
☐ Edit Lock
☐ Global

FIG. 10

Function Builder: Display ZFUNCTION_HARD_SOFT

Function module    ZFUNCTION_HARD_SOFT    Active

| Attributes | Import | Export | Changing | Tables | Exceptions | Source code |

```
1  FUNCTION zfunction_hard_soft.
2
3  *"*"Local Interface:
4  *"
5
6    DATA: 1v_test TYPE i.
7
8    1v_test = 1v_test + 1.
9
10   WRITE 1v_test.
11
12 ENDFUNCTION.
```

---

Dictionary: Display Table

Transparent Table    ZSCI_T_RESOLVRD    Active
Short Description    SCI Exemption Reason

| Attributes | Delivery and Maintenance | Fields | Input Help/Check | Currency/Quantity Fields | Indexes |

Delivery Class    A   Application table (master and transaction data)

Data Browser/Table View Editing    Display/Maintenance Allowed with Restrictions

FIG. 11

| Dictionary: Display Technical Settings | | |
|---|---|---|
| Revised<->Active | | |

| Name | ZSCI_T_RESOLVED | Transparent Table |
|---|---|---|
| Short Descript. | SCI Exemption Reason | |
| Last Changed | KHULLAR | 19.01.2020 |
| Status | Actv. | Saved |

General Properties | DB-Specific Properties

Logical Storage Parameters

| Data Class | APPL1 | Transaction Data, Transparent Tables |
|---|---|---|
| Size Category | 9 | Expected Data Records 4.800.000 to 190.000.000 |

Buffering
- ◉ Buffering Not Allowed
- ○ Buffering allowed but switched off
- ○ Buffering Activated

Buffering Type
- ☐ Single records buff.
- ☐ Generic Area Buffered     Number of Key Fields  0
- ☐ Fully Buffered ☐ Log Data Changes
☐ Writes only with JAVA

FIG. 12

Dictionary: Display Table

Transparent Table: ZSCI_T_RESOLVRD      Active
Short Description: SCI Exemption Reason

| Field | Key | Initi... | Data element | Data Type | Length | Decimal... | Short Description |
|---|---|---|---|---|---|---|---|
| MANDT | ☑ | ☑ | MANDT | CLNT | 3 | 0 | Client |
| INSP | ☑ | ☑ | SCI_INSP | CHAR | 30 | 0 | Code Inspector: Element Name of an Inspection |
| OBJTYPE | ☑ | ☑ | TROBJTYPE | CHAR | 4 | 0 | Object Type |
| OBJNAME | ☑ | ☑ | SOBJ_NAME | CHAR | 40 | 0 | Object Name in Object Directory |
| COMPONENT | ☑ | ☑ | UFPS_POSID | CHAR | 24 | 0 | Application component ID |
| TEST | ☑ | ☑ | SCI_CHK | CHAR | 30 | 0 | Code Inspector: Name of Check Class |
| CODE | ☑ | ☑ | SCI_ERRC | CHAR | 10 | 0 | Code Inspector: ID for Message Code |
| SOBJTYPE | ☑ | ☑ | TROBJTYPE | CHAR | 4 | 0 | Object Type |
| SOBJNAME | ☑ | ☑ | SOBJ_NAME | CHAR | 40 | 0 | Object Name in Object Directory |
| DESCRIPTION | ☑ | ☑ | SCI_ALVCHKTXT | CHAR | 60 | 0 | Code Inspector: Check Description for ALV Outpute |
| KIND | ☑ | ☑ | SCI_ERRTYN | CHAR | 3 | 0 | Code Inspector: Message Type (Info, Warning, ....) |
| LINE | ☑ | ☑ | SCI_LINE | NUMC | 6 | 0 | Code Inspector: Line Number for Message |
| COL | ☑ | ☑ | SCI_CLMN | NUMC | 4 | 0 | Code Inspector: Column Number for Message |
| TEXT | | ☐ | SCI_MESSAGEN | STRING | 0 | 0 | CI: Message Text |

FIG. 13

DIFFERENTIATING BETWEEN HARD AND SOFT DEPENDENCIES IN SOFTWARE OBJECTS

CROSS-REFERENCE TO RELATED APPLICATION

This application claims priority under 35 U.S.C. § 119 to Indian Patent Application number 202011014506 filed Apr. 1, 2020, and entitled "Differentiating Between Hard and Soft Dependencies in Software Objects", the entire contents of which is hereby expressly incorporated by reference herein.

TECHNICAL FIELD

The subject matter described herein relates to differentiating between hard and soft dependencies in software objects.

BACKGROUND

Software can include various software objects, such as data types with properties, methods, and which can contain other objects. In many programming languages, objects are defined as classes, functions, data objects, and the like. Different systems can be used for the development, testing, and consolidation of software. During the development phase, new software objects are created, and existing objects are changed in the development system. These changes are moved from the development system to the test/consolidation system via transport requests. A transport request can include a packet and/or a collection of new software objects or changes made to existing objects within a development system.

SUMMARY

In an aspect, data is received at a source system and characterizing a modified first software object for transport to a destination system via a request and to update a first software object deployed on the destination system. A first dependency of the modified first software object on a second software object is determined by the source system. An inconsistency between the modified first software object and the second software object is identified by the source system and using the first dependency. Data indicative of the inconsistency is provided.

One or more of the following features can be included in any feasible combination. For example, the identifying the inconsistency can include: classifying the first dependency as a hard dependency type or a soft dependency type, the hard dependency type indicative of an inconsistency between the modified first software object and the second software object at the destination system, and the soft dependency type indicative of consistency between the modified first software object and the second software object at the destination system. The classifying can include recreating an environment of the destination system at the source system by at least accessing an object versioning database including data characterizing versions of objects at the destination system. The classifying can further include determining that the second software object has not previously been transported to the destination system and, in response, determining the dependency to be the hard dependency type. The classifying can include: determining that the modified first software object depends upon itself; and classifying the first dependency as the hard dependency type. The classifying the first dependency can be performed at least using a binary predictive model. The determining the dependency type can be utilized to train a binary predictive model.

The destination system can include a database management test system for modification and testing of software objects. The source system can include a database management development system for developing software objects. The request can include a data packet including a plurality of modified software objects, which when received by the destination system, causes the destination system to replace existing software objects with corresponding modified software objects contained in the request. The first dependency can characterize that operation of the second software object is affected by the modified first software object. Determining the first dependency can include determining that the second software object is referred to by the modified first software object. Determining the dependency and identifying the inconsistency can be performed prior to release of the request by the source system.

Non-transitory computer program products (i.e., physically embodied computer program products) are also described that store instructions, which when executed by one or more data processors of one or more computing systems, causes at least one data processor to perform operations herein. Similarly, computer systems are also described that may include one or more data processors and memory coupled to the one or more data processors. The memory may temporarily or permanently store instructions that cause at least one processor to perform one or more of the operations described herein. In addition, methods can be implemented by one or more data processors either within a single computing system or distributed among two or more computing systems. Such computing systems can be connected and can exchange data and/or commands or other instructions or the like via one or more connections, including a connection over a network (e.g. the Internet, a wireless wide area network, a local area network, a wide area network, a wired network, or the like), via a direct connection between one or more of the multiple computing systems, etc.

The details of one or more variations of the subject matter described herein are set forth in the accompanying drawings and the description below. Other features and advantages of the subject matter described herein will be apparent from the description and drawings, and from the claims.

DESCRIPTION OF DRAWINGS

FIG. 1B illustrates screenshots of example software object code;

FIGS. 2-5C are screen shots of a development environment showing example software object code;

FIG. 9 illustrates the observance of a consistency error;

FIGS. 10-13 illustrate example changes to software objects that would result in patterns of hard and soft dependencies;

Like reference symbols in the various drawings indicate like elements.

DETAILED DESCRIPTION

Figure 1A:
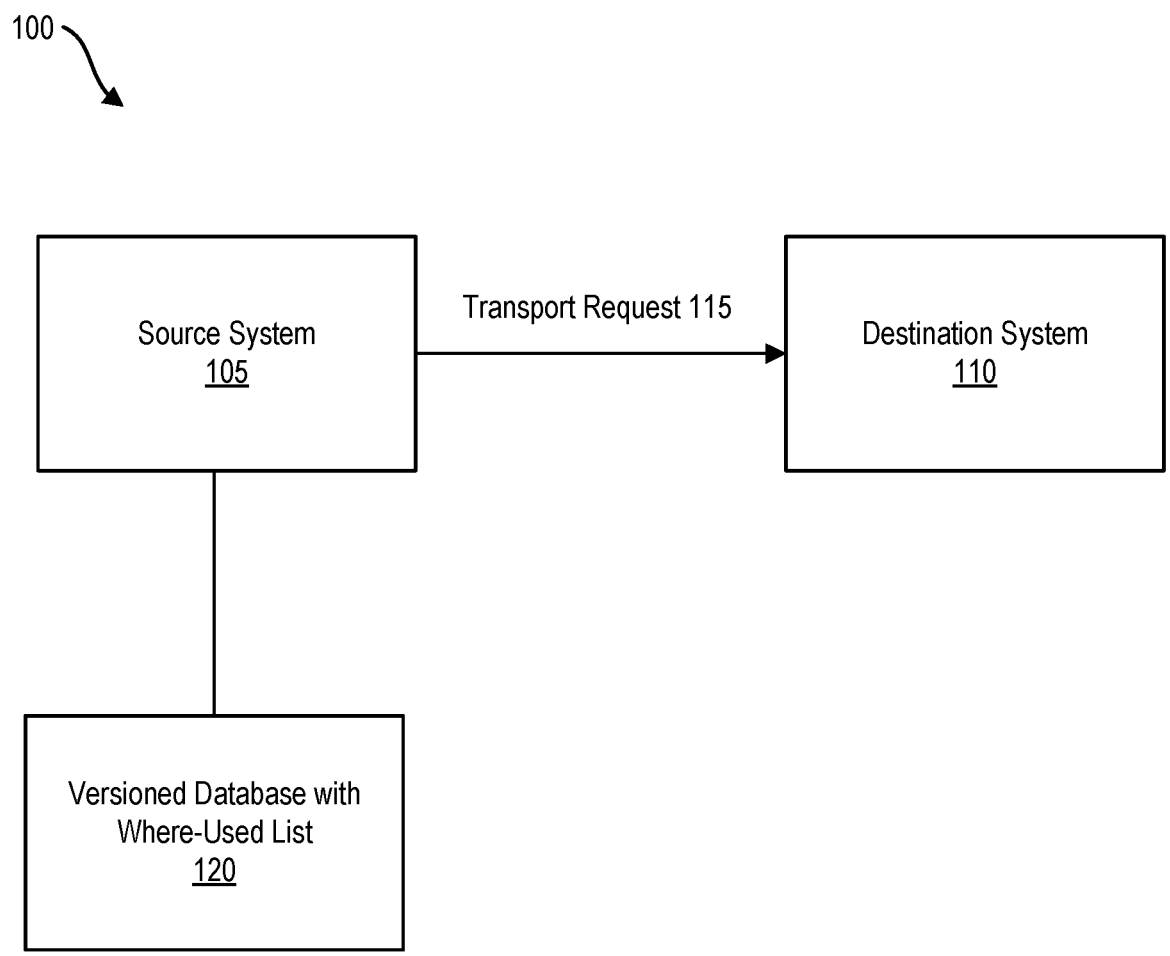
FIG. 1A is an example system illustrating a source system and a destination system according to some aspect of the current subject matter.

As noted above, a transport request can include a packet and/or a collection of new software objects or changes made to existing objects within a development system that are to be transported to a destination system, such as a test system, production system, and the like. During the release of a transport request, objects in the transport request undergo a consistency check to determine that they are in a consistent and syntax error free state. When all objects have passed the consistency checks, the development system (also referred to as a source system) can release the transport request. Once released, the transport request can be automatically imported into the destination system (e.g., test or consolidation system). After the transport request is imported, the objects that are part of the transport request are available in the test system for testing. However, since the consistency checks performed for a transport request may only check for the consistency in the source system and not the destination system, it is possible that the objects pass the consistency checks in the source system but become inconsistent on reaching the destination system. Inconsistent objects within the destination system can result in errors and/or unintended software operation, and the presence of such a situation can be referred to as an inconsistency. Consistent objects within the destination system does not result in errors and/or unintended software operation, and the presence of such a situation can be referred to as consistency.

Objects in the transport request may be dependent upon other objects that are not part of the same transport request. These other objects may be captured in other unreleased transport requests, for example. Further, the dependency on the other object changes can be considered to be a hard dependency or a soft dependency. When the objects include a dependency and become inconsistent in the destination system due to a modification to one or more of the objects, the dependency is considered to be a hard dependency. When the objects include a dependency and do not become inconsistent in the destination system due to a modification to one or more of the objects, the dependency is considered to be a soft dependency. In other words, the soft dependency type is indicative of consistency between dependent software object.

Accordingly, some implementations of the current subject matter include an approach to identifying changes to software objects that result in inconsistencies prior to their deployment from the source system to the destination system. Such an approach can include determining, for a given modified software object, the presence of a dependency and then classifying that dependency as a hard dependency type, which would result in an inconsistency in the destination system, or a soft dependency type, which would not result in an inconsistency in the destination system. In some implementations, the environment of the destination system can be recreated at the source system to ensure that consistency checks take into consideration the destination system rather than the environment of the source system. By identifying the presence of a dependency and then classifying that dependency as a hard dependency type or soft dependency type, some implementations of the current subject matter can ensure consistency in the destination system even when there are multiple transport requests containing modified objects with complex dependencies.

Some implementations of the current subject matter include an approach for differentiating between hard and soft dependencies between software objects. This mechanism can be utilized at the time of transport request consistency checks to prevent release of transport requests containing objects that are hard dependent upon changes locked in other unreleased transport requests. In some implementations, this approach can be realized using the concept of a where-used list to determine dependencies and then using version management to segregate hard and soft dependencies between objects and their pertinent transport requests. In some implementations, a machine learning model can be trained using various parameters of the software object, dependent object, and the type of change to discriminate hard and soft dependencies without retrieving a version management for the object.

As described herein, an object (e.g., object A) can be considered to be directly referencing to a second software object (e.g., object B) when the second object (e.g., object B) is being used directly in the first object (e.g., object A). Multiple other software objects can be used in a single object. An object A can be indirectly referencing to another software object B when the other object is being used in another object C, which is being directly/indirectly referred to in object A. This can be a complete chain of references with branches. For example, A→B→C→D. A software object can be dependent on another software object when the other object is a pre-requisite for the object to function. The dependency can be on directly referred objects as well as on indirectly referred objects.

Changes done to the software objects which make the dependent objects incompatible/inconsistent can be said to be producing hard dependency between the dependent objects and the changes made to the object. Changes done to the software objects which do not make the dependent objects incompatible/inconsistent can be said to be producing soft dependency between the dependent objects and the changes made to the object.

FIG. 1A is an example system 100 illustrating a source system 105 and a destination system 110 according to some aspect of the current subject matter that can enable identifying inconsistencies caused by changes in software objects and prior to their deployment from the source system to the destination system. The example system 100 according to some implementations of the current subject matter can ensure consistency in the destination system even when there are multiple transport requests containing modified objects with complex dependencies.

Source system 105 can include the system where the objects are created or changed. In some implementations, the source system 105 is only used for development and not for testing. The destination system 110 can include a system used for testing the functionality associated with the software objects. The software objects can be moved from the source system to the destination system using a transport request 115. A transport request 115 can include a packet/ collection of new software objects or changes made to existing objects that are done in the source/development system. This collection can be first checked for consistency and is then released to the destination system 110. Only consistent transport requests can be released to the destination system 110. The new objects or changes that are captured in the transport request 115 can then be deployed into the destination system 110.

Software object versioning can be included in a versioning database 120 to keep track of all the released changes to a software object. Based on the timeline of the changes, software object version can be of three types: created version, released version, and active version. Created version can refer to the first transported version of a software object. The created version of the object can be associated with the transport request 115 in which the object was created and released to the destination system 110. Released versions of a software objects can include the subsequent transported version of the software objects. The changed version of the object is associated with the transport request 115 in which the corresponding change to the object was captured and released to the destination system 110. Active version can include the latest consistent version of the software. For already released objects, which haven't undergone any change, the active version can include the last released version of the object. In this case, the active version can be associated to the last released transport request that the object was a part of. For newly created objects or objects changed after the last released version, the active version can include the latest consistent version of the object. The active version of a software object in this case can be associated to the unreleased transport request that object is part of.

A where-used list can be included in the versioned database 120 to maintain direct references between the software objects in the development/source system 105. The versioned database 120 can be updated when a software object is either created or changed. The versioned database 120 can be queried to determine which software objects are and/or were being used by an object in a specific version of the software object.

As noted above, some implementations of the current subject matter can include preventing the release of otherwise consistent objects before the release of their prerequisite changes in other objects by at least determining and classifying object dependencies. This can be important because not all kinds of dependencies cause the dependent objects to become inconsistent in the destination system. The relationship between objects thus can be classified as no dependency, soft dependency, and hard dependency. As noted above, an object A is said to be independent of object B, when there is no direct or indirect reference of object B in object A.

An object A is said to be soft dependent upon specific changes done to object B, when though there is a direct/indirect reference to object B in object A, the specific changes done to object B would not impact consistency of object A in the destination system 110. The soft dependencies may be included by the object owners (e.g., developers) who can include the soft dependencies for clarity in code (e.g., to maintain orderliness and/or cleanliness of the code). An object can be soft dependent on new changes to an existing/already released object.

As an example of a soft dependency, consider the following. Code is developed in source system: system_src; a new function: 'ZFUNCTION_HARD_SOFT' is created with some code and changes are locked in a transport request: TR1. The function ZFUNCTION_HARD_SOFT has no parameters in the signature initially. FIG. 1B illustrates example software object code 130.

Figure 3:
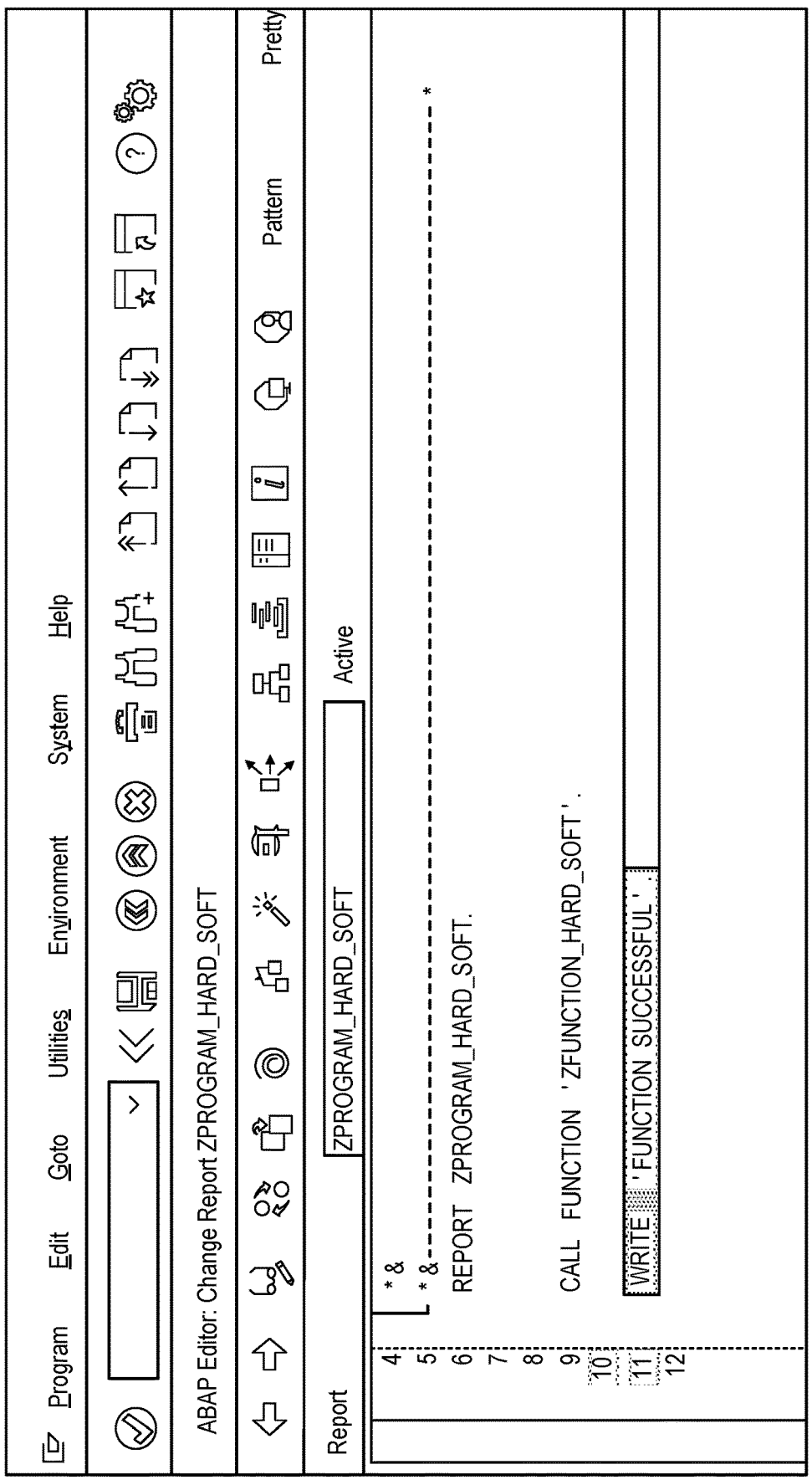

A new program: 'ZPROGRAM_HARD_SOFT', is created that uses the function: ZFUNCTION_HARD_SOFT. This new object is locked in the same transport request: TR1. FIG. 2 is a screen shot of a development environment showing example software object code 200. Consider that transport request: TR1 has been checked and released to the destination system. The import in the destination system is successful as both the objects are present in the system. Now consider that the code inside the function: ZFUNCTION_HARD_SOFT is changed, a new Transport Request: TR2 is created and captures the changes to the object in it. The example changes to the object are illustrated in FIG. 2, for example, the addition of line 7 in code. Additional changes are made to the program: ZPROGRAM_HARD_SOFT, as shown at line 11 of FIG. 3. These changes also capture the changes in another Transport Request: TR3. Consider that the source system then attempts to release Transport Request: TR3 (containing the changes to the program) before releasing the Transport Request: TR2. In this case, the new changes in the program: ZPROGRAM_HARD_SOFT captured in TR3 reach the destination system. However, the function: ZFUNCTION_HARD_SOFT is still in the older state. The latest code for the two objects in the destination system would be as shown in FIG. 4, which includes example code. As illustrated in FIG. 4, even if the latest changes in the dependent object reach the destination system without the latest changes in the object that it is dependent upon, the object remains consistent. This is an example of a dependency that is a soft dependency between the latest changes in the object: ZPROGRAM_HARD_SOFT and the latest changes in the object: ZFUNCTION_HARD_SOFT.

As noted above, an object A is said to be hard dependent upon specific changes done to object B, when there is a direct/indirect reference to object B in object A, and the specific changes done to object B also impact the consistency of object A in the destination system. An object can be hard dependent on a newly created object as well as the changes that are done to an existing/already released object. However, hard dependencies only cause inconsistency in destination system if the objects reach the destination system before the dependent objects reach the destination system. So, the following cases would not lead to inconsistency in the destination system: (1) when both the object and its pre-requisite object are part of the same transport request; and (2) when the transport request containing the pre-requisite object is released before releasing the transport request containing the object which is dependent on the pre-requisite object.

Figure 5A:
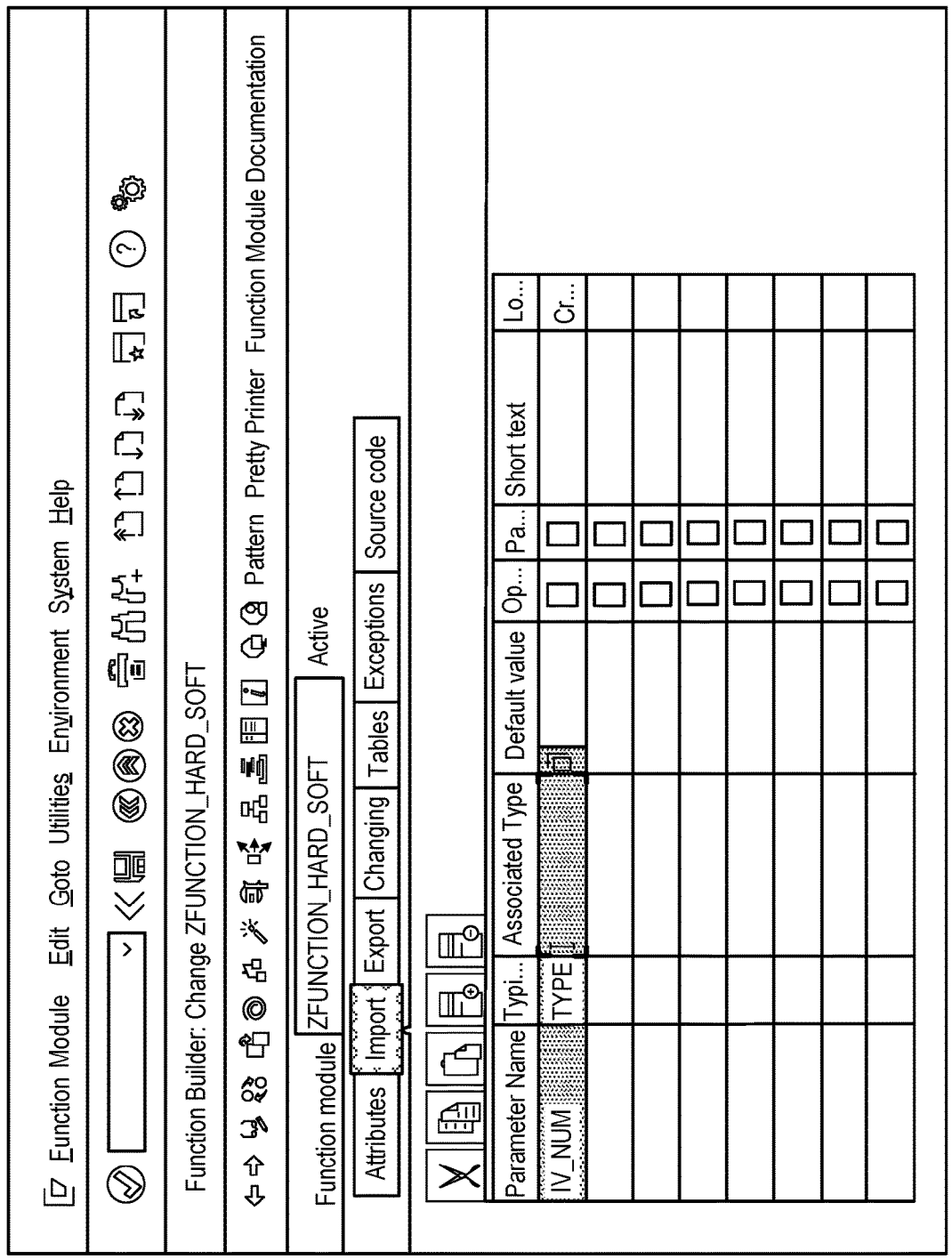

As an example of a hard dependency, consider the example for soft dependency, but with a change to the signature of the function: ZFUNCTION_HARD_SOFT rather than changing the code inside it. Consider then these changes being captured in the transport request: TR2. The calling program: ZPROGRAM_HARD_SOFT would have to include changes accordingly to make it consistent/compatible with the new changes in the development system. Consider that the corresponding changes are included in a different Transport Request: TR3. If the Transport Request: TR3 is released to the destination system without releasing the Transport Request: TR2, the program: ZPROGRAM_HARD_SOFT would become inconsistent as shown in FIG. 5A-C as the latest signature of the function: ZFUNCTION_HARD_SOFT is not available in the destination system.

Accordingly, the problem of distinguishing between hard and soft dependencies can be considered a complex problem as the nature and type of changes that can be done to a software object can be varied based on the type of object. A pre-defined criterion based on the type of object and the type of change may not be a feasible and scalable solution to categorize changes as causing hard and soft dependencies. Moreover, the determination/categorization of dependencies is required at the time of release of transport request. By this time, it is likely that the dependent objects would have been made compatible to the new changes, hence the hard/soft dependency cannot be determined from the latest version of the object. Thus, some implementations of the current subject matter include an approach to determining hard and soft dependencies.

Figure 6:
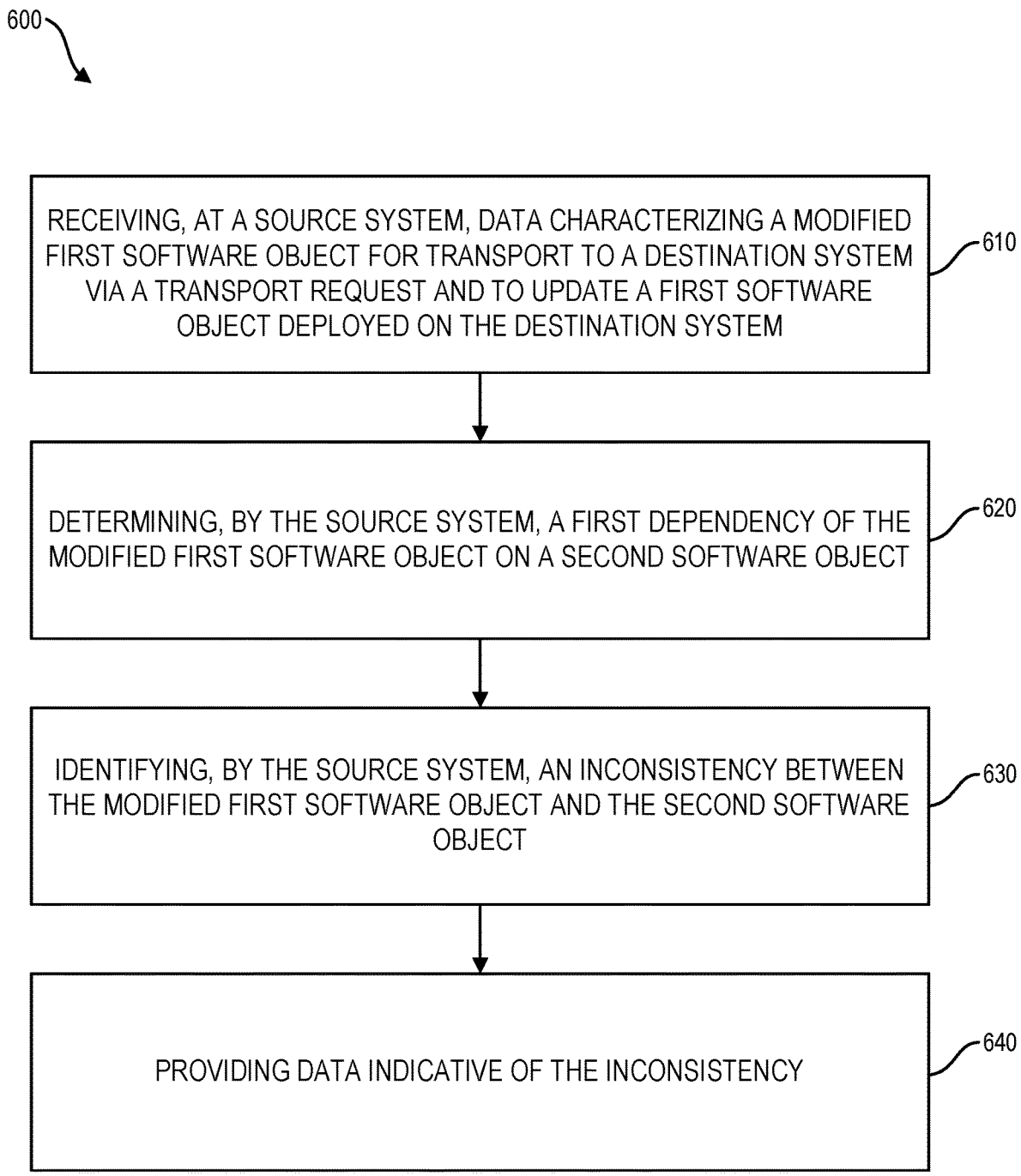
FIG. 6 is a process flow diagram illustrating an example process of identifying inconsistencies caused by changes in software objects and prior to their deployment from the source system to the destination system that can ensure consistency in the destination system even when there are multiple transport requests containing modified objects with complex dependencies.

FIG. 6 is a process flow diagram illustrating an example process 600 of identifying inconsistencies caused by changes in software objects and prior to their deployment from the source system to the destination system that can ensure consistency in the destination system even when there are multiple transport requests containing modified objects with complex dependencies.

At 610, data is received characterizing a modified first software object for transport to a destination system via a transport request and to update a first software object deployed on the destination system. The data can be received at the source system. For example, the source system can include a database management development system for developing software objects. The destination system can include a database management test system for testing of the software objects. The transport request can include a data packet including modified software objects, which when received by the destination system, causes the destination system to replace existing software objects with corresponding modified software objects contained in the transport request.

At 620, a first dependency of the modified first software object on a second software object is determined by the source system. Determining the dependency can be performed prior to release of the transport request by the source system. The first dependency can characterize that operation of the second software object is affected by the modified first software object. The dependency can be direct or indirect. Determining the first dependency can include determining that the second software object is referred to by the modified first software object.

An object (e.g., object A) can be considered to be directly referencing to a second software object (e.g., object B) when the second object (e.g., object B) is being used directly in the first object (e.g., object A). Multiple other software objects can be used in a single object. An object A can be indirectly referencing to another software object B when the other object is being used in another object C, which is being directly/indirectly referred to in object A. This can be a complete chain of references with branches. For example, A→B→C→D. A software object can be dependent on another software object when the other object is a prerequisite for the object to function. The dependency can be on directly referred objects as well as on indirectly referred objects.

At 630, an inconsistency between the modified first software object and the second software object can be identified. The identifying the inconsistency can be performed prior to release of the transport request by the source system. The identifying the inconsistency can include classifying the first dependency as a hard dependency type or a soft dependency type. The hard dependency type can be indicative of an inconsistency between the modified first software object and the second software object at the destination system. The classifying can include recreating an environment of the destination system at the source system by at least accessing an object versioning database including data characterizing versions of objects at the destination system.

In some implementations, identification of inconsistencies can be performed for all objects that the first object depends upon. In some implementations, a list of dependent objects can be determined and can contain only objects which have been changed after their last released version, for example, their active version are not yet transported to the destination system and the latest versions are locked in a transport request other than the one in which the first object is locked.

The classifying can include determining that the second software object has not previously been transported to the destination system and, in response, determining the dependency to be the hard dependency type. The classifying can include determining a current version of the second software object; determining that the modified first software object depends upon itself; and classifying the first dependency as the hard dependency type. An example of classifying the dependency is illustrated and described in more detail with respect to FIG. 7A-B.

In some implementations, classifying the first dependency can be performed at least using a machine learning model, for example, a machine learning binary predictive model. As an example, using a first approach to determining the dependency type can result in training data, which can be utilized to train a predictive model. Once the predictive model is sufficiently trained, the predictive model approach can be faster and less computationally complex than the first approach.

At 640, data indicative of the inconsistency can be provided. For example, a message can be provided to a developer that the inconsistency was identified. The message can take the form of, for example, a message in a graphical user interface, a SMS, a slack message, an email report, and the like. Other formats are possible.

Figure 7A:
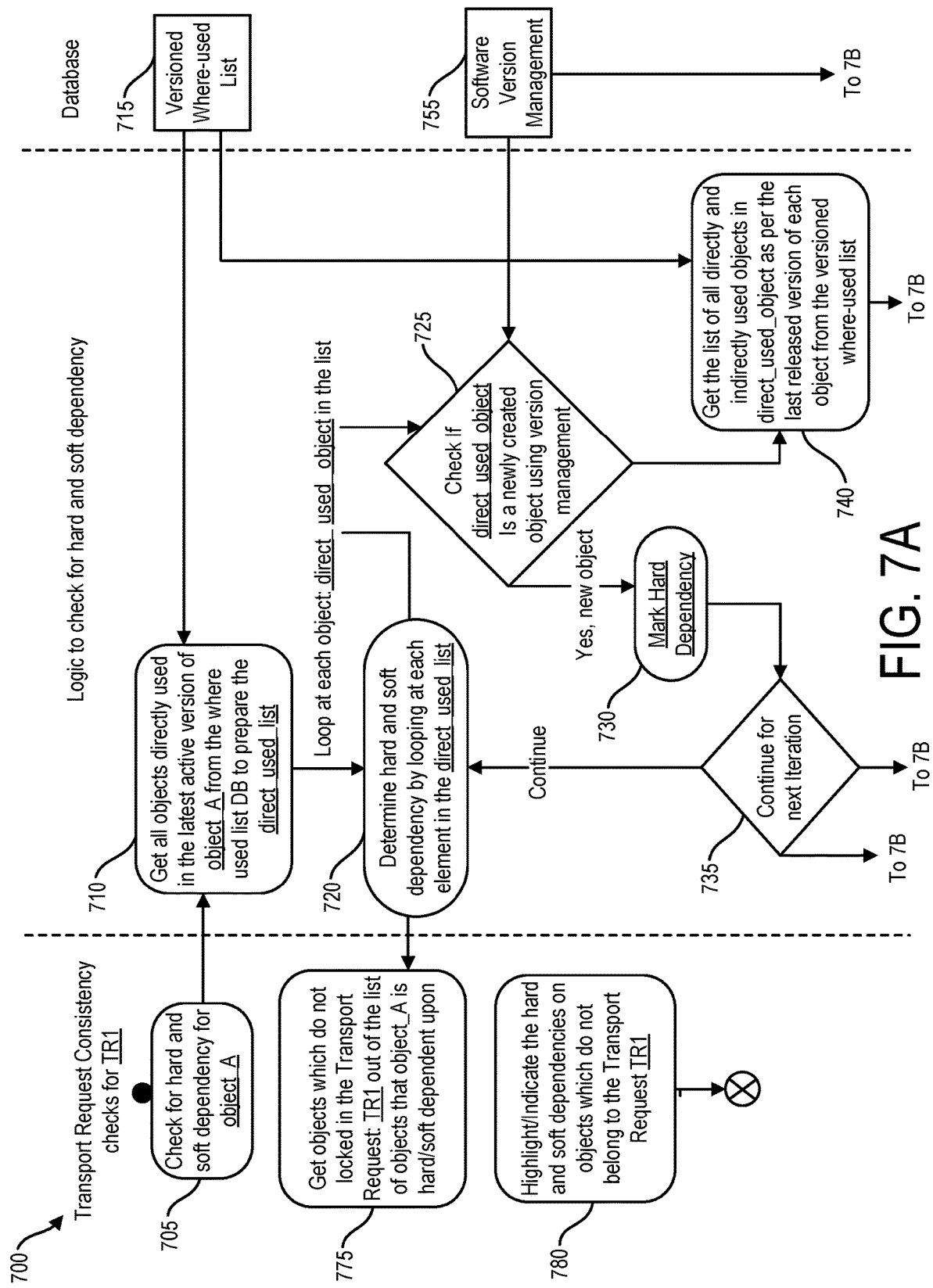
FIG. 7A-B is a data flow diagram illustrating an example process to check for hard and soft dependencies in software objects.
Figure 7B:
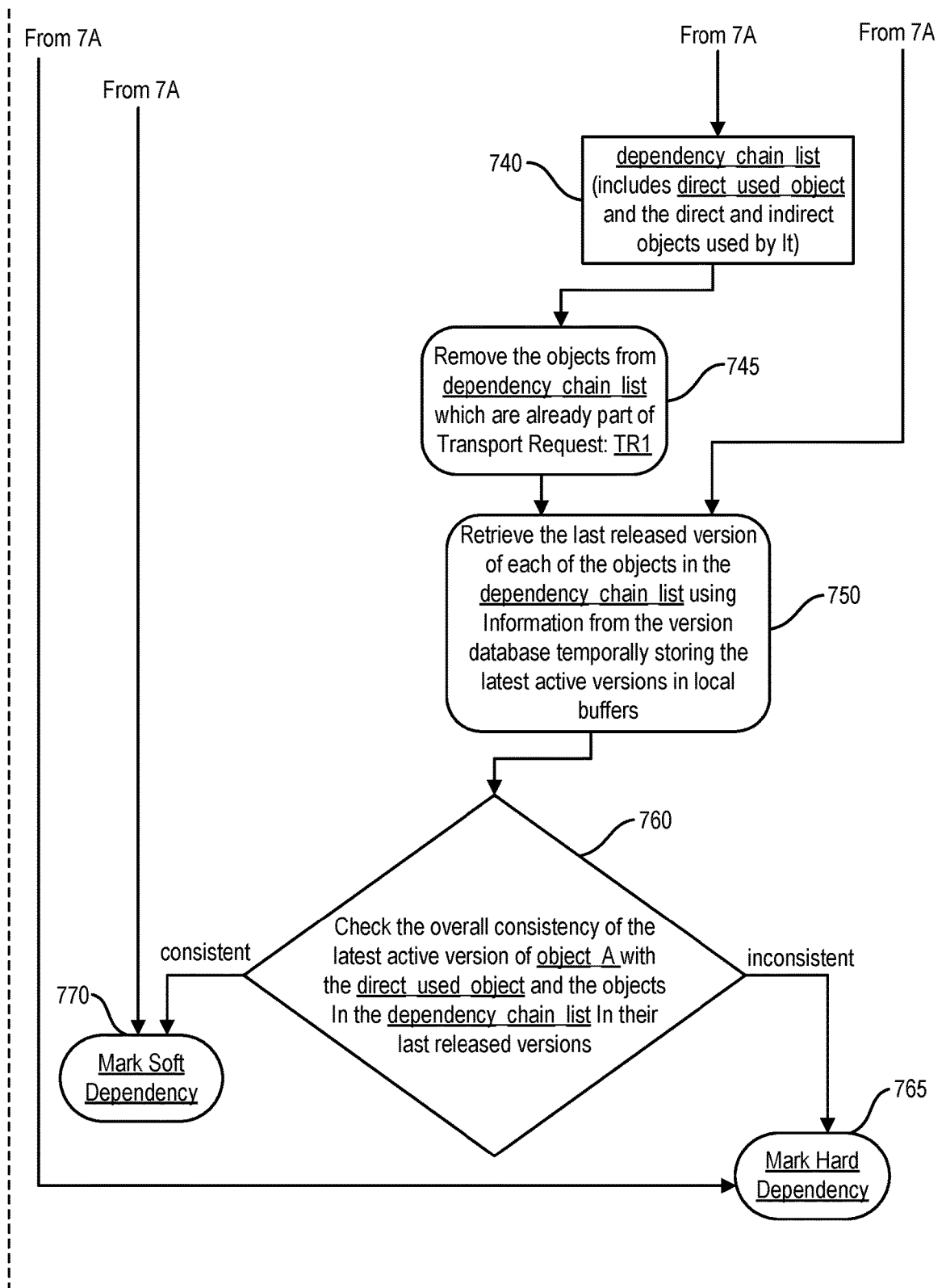

FIG. 7A-B is a data flow diagram illustrating an example process 700 to check for hard and soft dependencies in software objects. As an example of determining dependencies and identifying inconsistencies, consider that an object A (object_A) is under consideration to check for hard and soft dependencies on other objects, as indicated at 705. The object A is currently locked in a Transport Request: TR1. Some implementations of the current subject matter can include creating a state of objects as it would be in the destination system, when the Transport Request: TR1 reaches the destination system. It is noted that generally, TR1 may contain objects other than object A. Hence, this process can also be executed for the other objects to ensure the consistency of TR1. So, the consistency of all the objects in the TR1 can be checked together by performing these steps for all the object in TR1 together and creating a destination like environment.

An example implementation can include obtaining, at 710, all the objects that are referred to directly in the latest active version of object_A using the where-used list versioned database 715. The objects can be loaded into a local buffer: direct_used_list. For each object: direct_used_object in direct_used_list, at 720, it is possible to iterate to determine all dependency relationships. For each dependency relationship, the hard and soft dependency can be marked.

To mark the dependency as hard or soft, at 725, check if the direct_used_object is a newly created object (not transported to the destination system at least once) using the information from the version database. If direct_used_object is a new object, then the dependency is always a hard dependency since the direct_used_object would first have to reach the destination system for the object A to be consistent. At 730, the dependency can be marked as hard and the process can, at 735, continue to 720 to iterate for next direct_used_object. When the direct_used_object is not a newly created object, then the compatibility/consistency of the latest active version of object_A (locked in TR1) can be checked with the last released version of the direct_used_object along with the last released versions of directly/indirectly used objects in the direct_used_object to ensure that object_A remains consistent even if it is released to the destination system without the latest changes in the direct_used_object and its references.

The following steps can be executed to determine hard/soft dependency. At 740, the dependency_chain_list of directly and indirectly used objects in the direct_used_object as per the last released versions of each object can be prepared using the where-used list versioned database 715. The process can be repeated until the end of the chain is reached (e.g., the final objects which are not using any other objects). If object_A is found to be in the dependency_chain_list (e.g., a cyclic dependency on object_A), then the dependency can be marked as hard and the process can continue for the next direct_used_object. Otherwise, at 745, objects that are already part of the transport request TR1 can be removed from the dependency chain list. At 750, the last released version of each of the objects in the dependency_chain_list can be retrieved using information from the version database 755 temporarily storing the latest active versions in local buffers. It can be necessary to retrieve the latest version of each object in the dependency_chain_list since the last version of the direct_used_object may itself be dependent upon the objects in its dependency list. The overall consistency of the latest active version of object_A with the direct_used_object and the objects in the dependency_chain_list in their last released versions can be checked at 760.

The latest active versions of used_object and the objects in the dependency_chain_list from the local buffers can be retrieved. If the consistency check for object_A fails, then there is hard dependency between the object_A and the latest changes in the used_object and its directly/indirectly referred objects. At 765, the dependency can be marked as hard and the process can, at 735, continue for next direct_used_object. If the consistency check for object_A passes, then there is a soft dependency between the object_A and the latest changes in the direct_used_object and its directly/indirectly referred objects. At 770, the dependency can be marked as soft, and the process can, at 735, continue for next used_object. At 775, objects which are not locked in the transport request TR1 can be removed from the list of objects that object_A is dependent upon and at 780.

Consider the previously described example. In the step where the Transport Request: TR3 (containing the changes to the program) was attempted to be released before releasing the Transport Request: TR2, a new automated check can be added for highlighting the hard and soft dependencies for the contained object (program: ZPROGRAM_HARD_SOFT) before the release of the TR3.

This check can include getting the list of objects used by ZPROGRAM_HARD_SOFT from the versioned where-used list; finding that function: ZFUNCTION_HARD_SOFT is the only object used in the program. Then, the check can include checking if the object ZFUNCTION_HARD_SOFT is a newly created object. If it was a newly created object, then straightaway it can be marked as a hard dependency. But since the object ZFUNCTION_HARD_SOFT had been transported at least once to the destination system, the process would proceed with the next step. Next, obtain the list of objects used directly by ZFUNCTION_HARD_SOFT in its last released version, for example, the current state of the object in the destination system. Along with the list of objects used directly by ZFUNCTION_HARD_SOFT in the last released version, also fetch list of objects used indirectly by ZFUNCTION_HARD_SOFT in the last released version. This can involve a recursive call for each object in used list and then again in next used list till the end of the chain (e.g., the objects which do not use any subsequent objects) is reached, thereby preparing the dependency chain.

Figure 8:
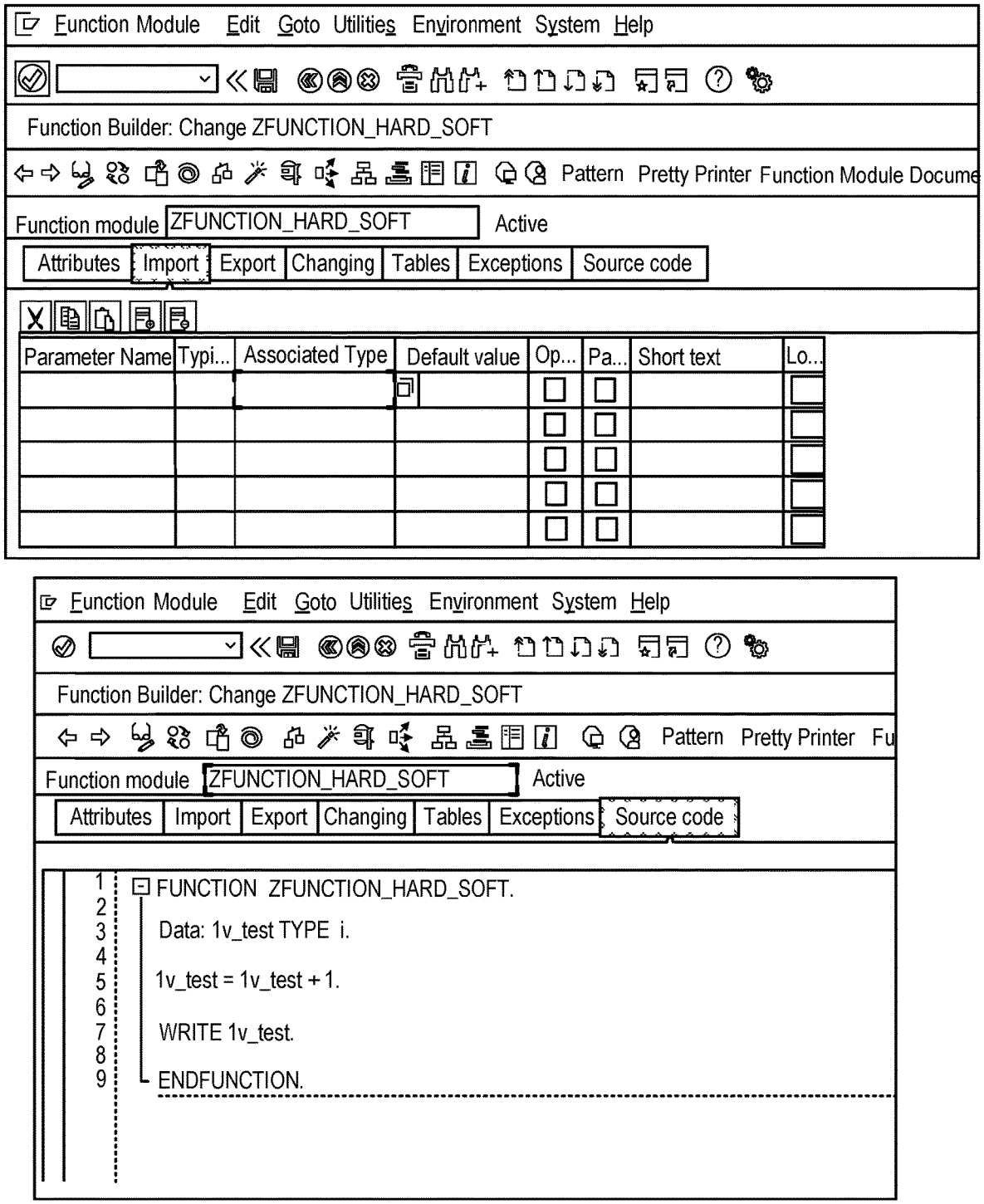
FIG. 8 illustrates an example last released version of an example software object.
Figure 9:
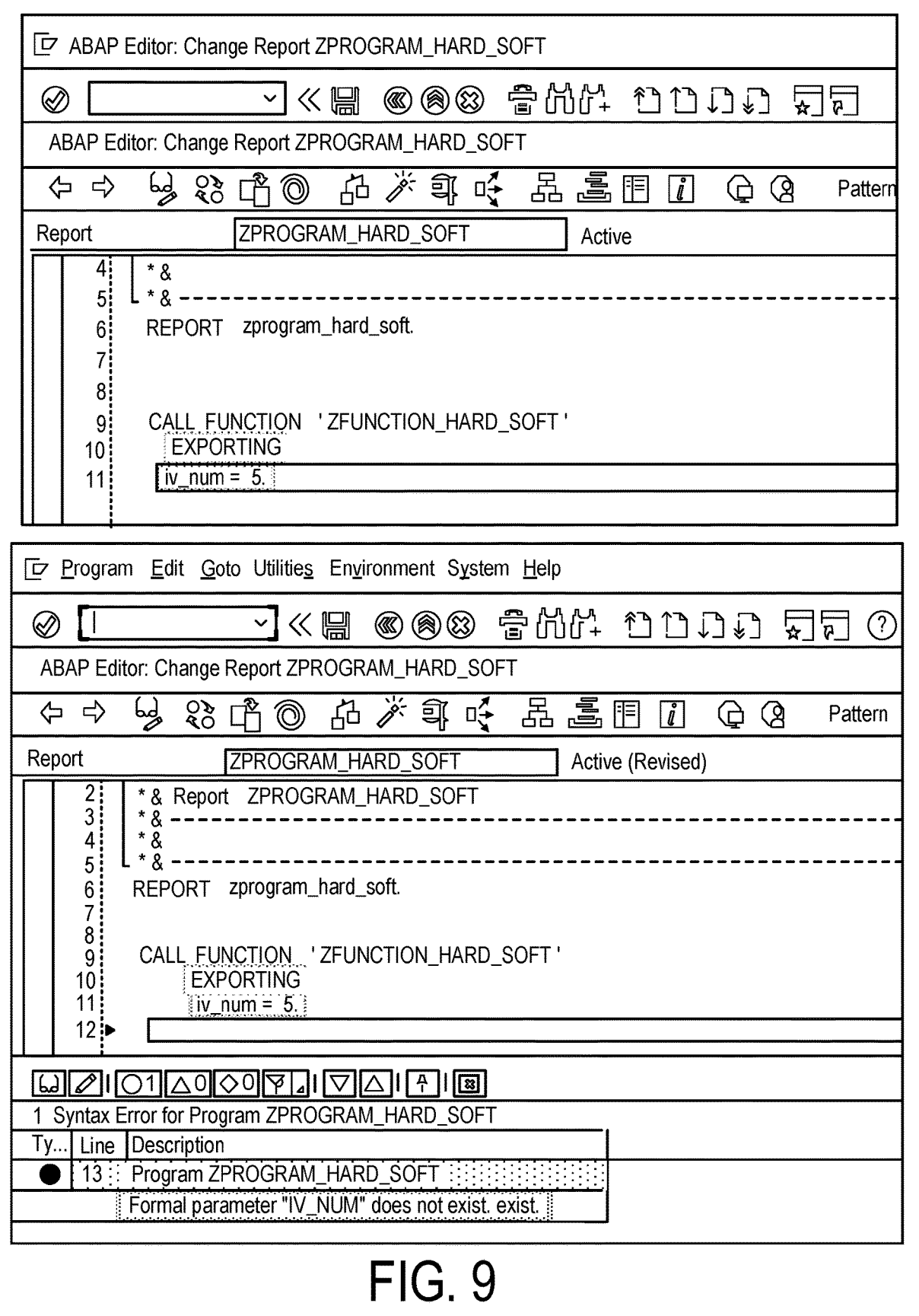

Next, it is possible that some objects in the dependency chain which are also part of the same Transport Request in which ZPROGRAM_HARD_SOFT is locked. These objects can be removed from the dependency chain as these objects would be in their latest state when the Transport Request reaches the destination system. In this case ZFUNCTION_HARD_SOFT is the only object in the list. The last released version of the ZFUNCTION_HARD_SOFT can then be retrieved. FIG. 8 illustrates the example last released version of the ZFUNCTION_HARD_SOFT. The consistency of the program: ZPROGRAM_HARD_SOFT can be checked. FIG. 9 illustrates the observance of a consistency error. In the example, a consistency error would be observed, and the dependency can be marked as a hard dependency. In the example of soft dependency, there would not be any consistency error observed, and hence a soft dependency would be marked. The hard and the soft dependencies can then be highlighted to the end user, for example, in a user interface for consistency checks. For hard dependencies, there can be a hard requirement to release the pre-requisite object changes before releasing the transport request. For soft dependencies, although there is no such hard requirement, the final decision can be left up to the discretion of the owner of the transport request.

Some implementations of the current subject matter can include utilizing machine learning, for example, predictive modeling, to leverage patterns in hard and soft dependencies. If the objects with hard and soft dependencies are observed, a pattern can be observed with respect to the type of objects, type of dependent objects and the type of changes that are done to the respective objects. For a function or a method, the changes that are done to the description/information/short text or the source code can produce soft dependencies on the dependent objects. The changes to the signature of the function/method, however, in most cases produces hard dependency on the dependent objects.

For an object such as a database table, the changes to delivery class, description or general settings, and the like generally produces soft dependencies on the dependent object. However, changes to the field structure would most often produce hard dependencies on the dependent objects. There can also be object changes that cause soft dependency on some type of dependent objects and hard dependency on other type of objects. For example, a data type change in a data element can create a soft dependency if included in a structure, whereas the same may cause hard dependency if used directly/indirectly in the source code of a method/function or report. FIGS. 10-13 illustrate example changes to software objects that would result in patterns of hard and soft dependencies.

As observed in the patterns described above, pre-defined criteria can be established for hard and soft dependencies for all the known objects and the changes possible to those objects. However, such criteria would not be scalable because the pre-defined criteria would have to be updated for each new type of objects and type of object changes that are added/updated to the repository. Hence, training utilizing a machine learning model for the hard and soft dependencies can be advantageous.

As an example, for an initial few (e.g., hundred or thousand) transport requests in a system, the solution approach described with respect to FIG. 7A-B can be utilized. Along with prompting the transport request owner for the hard and soft dependencies in the contained objects, a machine learning classification model can be trained within the system with the below mentioned parameters. An example table of the parameters is shown in table 1, below.

| Used Object Type | Type of change | Dep. object type | Usage in dependent obj | Direct/ indirect usage | Soft/hard dependency |
|---|---|---|---|---|---|
| Function | Signature | Program | Used in source code | Direct | Hard |
| Function | Source Code | Program | Used in source code | Direct | Soft |
| Data Element | Data Type | Structure | Used in field structure | Direct | Soft |
| Data Element | Data Type | Method | Used in source code | Indirect | Hard |
| Structure | Description | Table Type | Used in definition | Direct | Soft |

Other combinations, new object types, object changes are possible.

Figure 14:
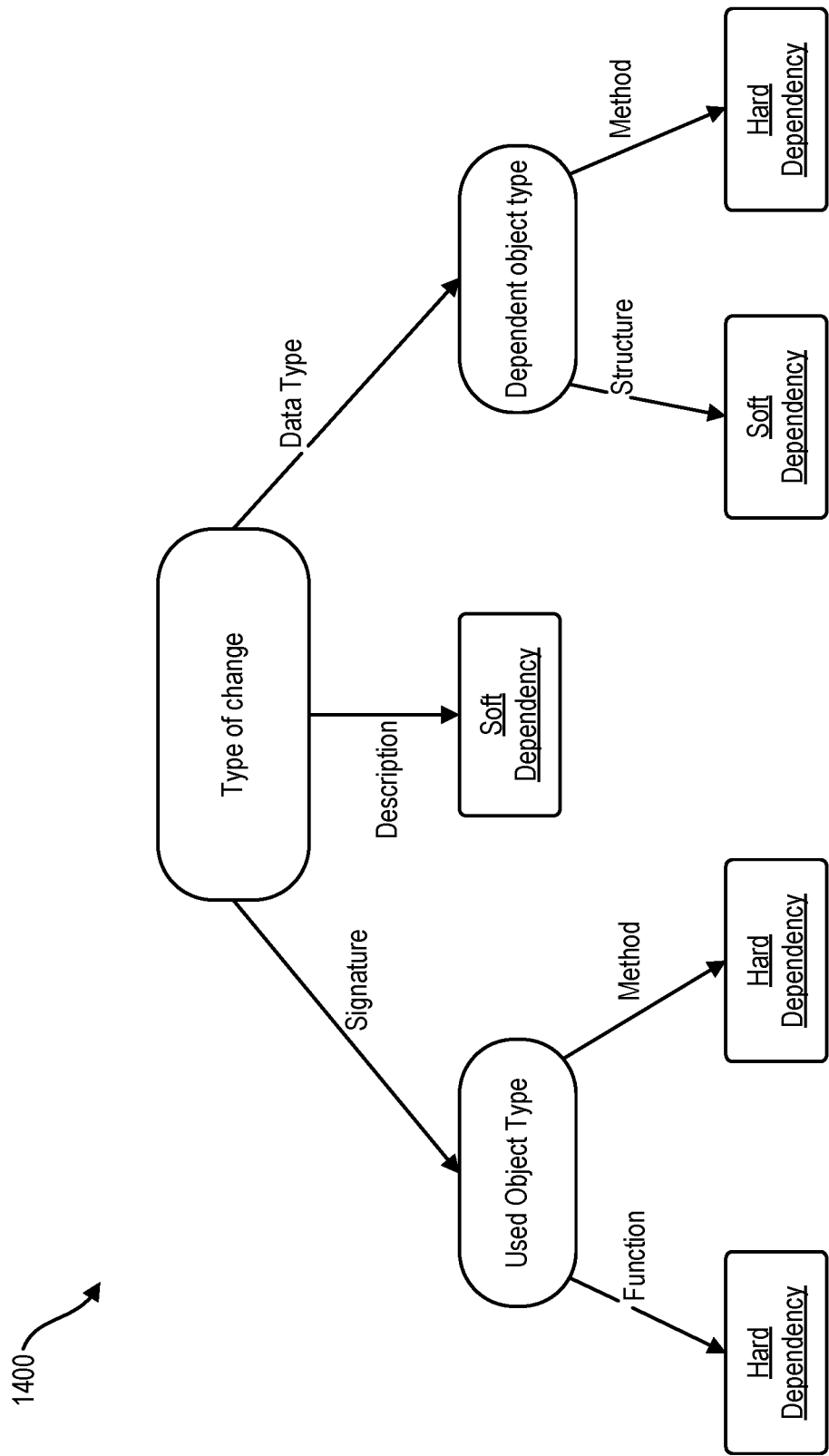
FIG. 14 illustrates an example tree-like structure.

The modelling tool can include a decision tree. A decision tree can be a useful way to represent this type of data because it can consider all the possible paths that can lead to the final decision by following a tree-like structure. FIG. 14 illustrates an example tree-like structure 1400 that corresponds to table 1, above.

An algorithm for a decision tree can include picking the best attribute/feature. The best attribute is one which best splits or separates the data. The algorithm can including asking a relevant question, follow an answer path, and repeating until the answer for hard/soft dependency is determined. The data for the hard and the soft dependencies can be computed and collected on each release of initial transport requests. Whenever a hard or a soft dependency is detected, the data corresponding to the object type, type of change, and dependent object type can be preserved. This preserved data can then be used to train the model as described above.

After enough iterations of the process described above for different kind of objects (e.g., hundred or thousand), the model's application programming interface (API) can be queried by passing the parameters (e.g., as described above) to obtain an initial prediction of the type of dependency that exists. This model can be leveraged at the time of subsequent dependency checks.

In operation (e.g., in real time operation, run time operation, and the like), the process of determination of hard and soft dependencies, as described above with respect to FIG. 7A-B, can be complicated and assessing deep dependencies (e.g., a long chain of dependencies) can be time consuming. For the end user, in some implementations, an option can be provided to obtain the initial prediction of hard and soft dependencies even without the execution of the complete process of retrieving prior released version of used objects. The parameters that are required for querying the machine learning model can be readily available through the where-used list and version management. These parameters, once fetched, can be passed to the machine learning model API. The result would be a prediction for the hard and soft dependency. The user can then decide upon the next possible actions. This approach can save time since the process of retrieving the last released versions, for example as described above with respect to FIG. 7A-B, can be eliminated based upon the user discretion.

For the purpose of continuation of model training, the complete process of retrieving last released versions may still be executed in an asynchronous process during the transport request consistency checks. This can ensure the model training for better prediction as well as time saving for the end user for the current process.

Figure 15:
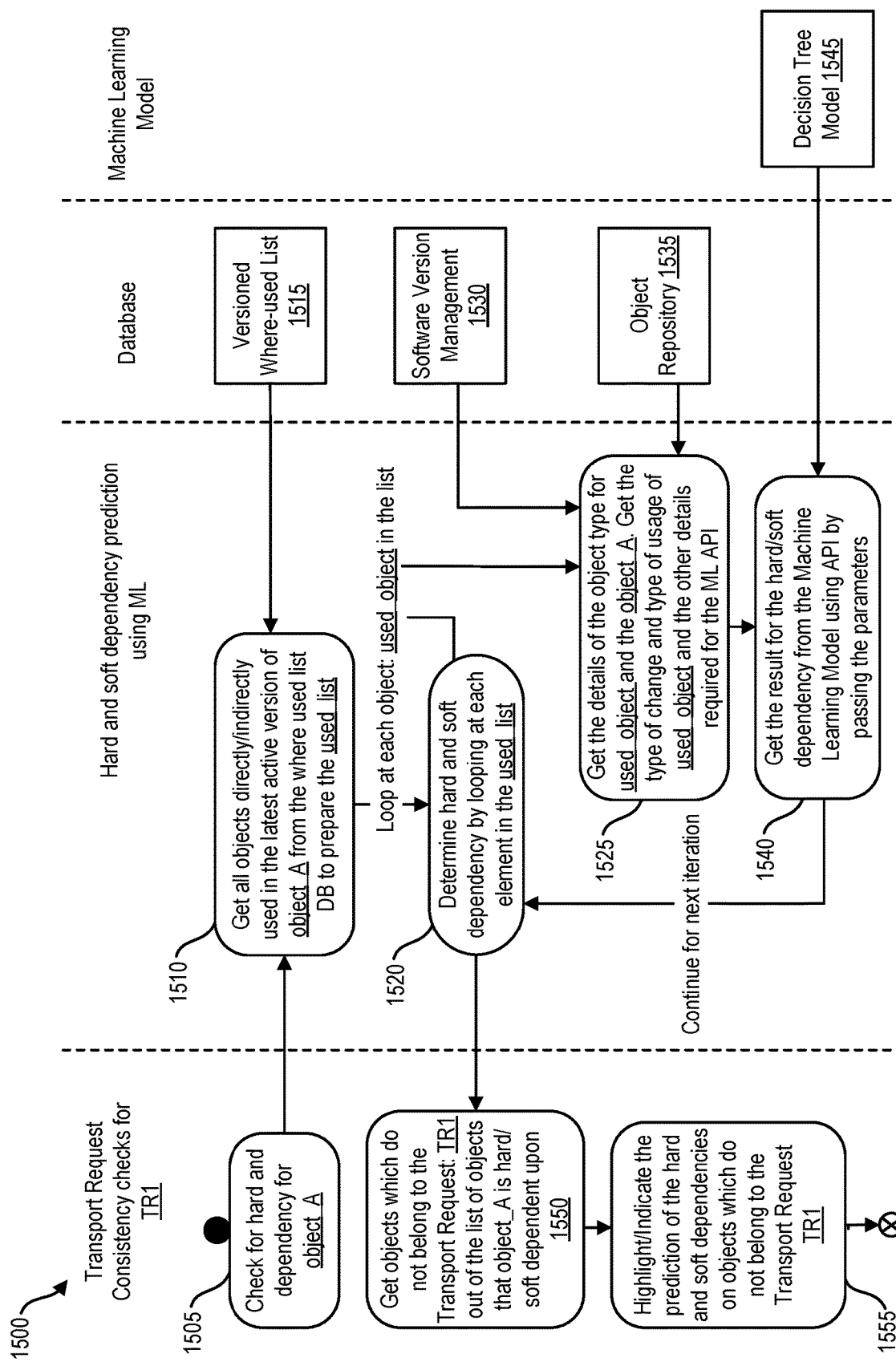
FIG. 15 illustrates an example data flow diagram for a process of determining hard and soft dependencies using a machine learning (e.g., binary predictive model) approach.

FIG. 15 illustrates an example data flow diagram for a process 1500 of determining hard and soft dependencies using a machine learning (e.g., binary predictive model) approach. At 1505, check for hard and soft dependency for object_A can be initiated. At 1510, all objects directly/indirectly used in the latest active version of object_A from the versioned where-used list database 1515 to prepare the used_list can be obtained. At 1520, hard and soft dependency can be determined by looping at each element in the used_list. At 1525, details of the object type for used_object and the object_A can be obtained and the type of change and type of usage of used_object can be obtained. This can include accessing a software version management database 1530 and an object repository 1535. At 1540, a result for the hard/soft dependency can be obtained from a machine learning model (e.g., decision tree model 1545) using an API by passing the previously obtained parameters. The process can return to 1520 for the next iteration. Once the iteration is complete, at 1550, objects which belong to the transport request: TR1 can be removed from the list of objects that object_A is hard/soft dependent upon. At 1555, the prediction of the hard and soft dependencies on objects which do not belong to the Transport Request TR1 can be provided, for example, highlighted and/or indicated to a user via a user interface or other channel.

One or more aspects or features of the subject matter described herein can be realized in digital electronic circuitry, integrated circuitry, specially designed application specific integrated circuits (ASICs), field programmable gate arrays (FPGAs) computer hardware, firmware, software, and/or combinations thereof. These various aspects or features can include implementation in one or more computer programs that are executable and/or interpretable on a programmable system including at least one programmable processor, which can be special or general purpose, coupled to receive data and instructions from, and to transmit data and instructions to, a storage system, at least one input device, and at least one output device. The programmable system or computing system may include clients and servers. A client and server are generally remote from each other and typically interact through a communication network. The relationship of client and server arises by virtue of computer programs running on the respective computers and having a client-server relationship to each other.

These computer programs, which can also be referred to as programs, software, software applications, applications, components, or code, include machine instructions for a programmable processor, and can be implemented in a high-level procedural language, an object-oriented programming language, a functional programming language, a logical programming language, and/or in assembly/machine language. As used herein, the term "machine-readable medium" refers to any computer program product, apparatus and/or device, such as for example magnetic discs, optical disks, memory, and Programmable Logic Devices (PLDs), used to provide machine instructions and/or data to a programmable processor, including a machine-readable medium that receives machine instructions as a machine-readable signal. The term "machine-readable signal" refers to any signal used to provide machine instructions and/or data to a programmable processor. The machine-readable medium can store such machine instructions non-transitorily, such as for example as would a non-transient solid-state memory or a magnetic hard drive or any equivalent storage medium. The machine-readable medium can alternatively or additionally store such machine instructions in a transient manner, such as for example as would a processor cache or other random access memory associated with one or more physical processor cores.

To provide for interaction with a user, one or more aspects or features of the subject matter described herein can be implemented on a computer having a display device, such as for example a cathode ray tube (CRT) or a liquid crystal display (LCD) or a light emitting diode (LED) monitor for displaying information to the user and a keyboard and a pointing device, such as for example a mouse or a trackball, by which the user may provide input to the computer. Other kinds of devices can be used to provide for interaction with a user as well. For example, feedback provided to the user can be any form of sensory feedback, such as for example visual feedback, auditory feedback, or tactile feedback; and input from the user may be received in any form, including acoustic, speech, or tactile input. Other possible input devices include touch screens or other touch-sensitive devices such as single or multi-point resistive or capacitive trackpads, voice recognition hardware and software, optical scanners, optical pointers, digital image capture devices and associated interpretation software, and the like.

In the descriptions above and in the claims, phrases such as "at least one of" or "one or more of" may occur followed by a conjunctive list of elements or features. The term "and/or" may also occur in a list of two or more elements or features. Unless otherwise implicitly or explicitly contradicted by the context in which it is used, such a phrase is intended to mean any of the listed elements or features individually or any of the recited elements or features in combination with any of the other recited elements or features. For example, the phrases "at least one of A and B;" "one or more of A and B;" and "A and/or B" are each intended to mean "A alone, B alone, or A and B together." A similar interpretation is also intended for lists including three or more items. For example, the phrases "at least one of A, B, and C;" "one or more of A, B, and C;" and "A, B, and/or C" are each intended to mean "A alone, B alone, C alone, A and B together, A and C together, B and C together, or A and B and C together." In addition, use of the term "based on," above and in the claims is intended to mean, "based at least in part on," such that an unrecited feature or element is also permissible.

The subject matter described herein can be embodied in systems, apparatus, methods, and/or articles depending on the desired configuration. The implementations set forth in the foregoing description do not represent all implementations consistent with the subject matter described herein. Instead, they are merely some examples consistent with aspects related to the described subject matter. Although a few variations have been described in detail above, other modifications or additions are possible. In particular, further features and/or variations can be provided in addition to those set forth herein. For example, the implementations described above can be directed to various combinations and subcombinations of the disclosed features and/or combinations and subcombinations of several further features disclosed above. In addition, the logic flows depicted in the accompanying figures and/or described herein do not necessarily require the particular order shown, or sequential order, to achieve desirable results. Other implementations may be within the scope of the following claims.

What is claimed is:

1. A method comprising:
   receiving, at a source system, data characterizing a modified first software object for transport to a destination system via a request and to update a first software object deployed on the destination system;
   determining, by the source system, a first dependency of the modified first software object on a second software object;
   identifying, by the source system and using the first dependency, an inconsistency between the modified first software object and the second software object, the identifying including determining that the inconsistency would occur at the destination system if the modified first software object is transported to the destination system, the destination system different than the source system; and
   providing data indicative of the inconsistency,
   wherein the identifying the inconsistency includes:
      classifying the first dependency as a hard dependency type or a soft dependency type, the hard dependency type indicative of an inconsistency between the modified first software object and the second software object at the destination system, and the soft dependency type indicative of consistency between the modified first software object and the second software object at the destination system;
   wherein the classifying includes:
      determining that the modified first software object depends upon itself; and
      classifying the first dependency as the hard dependency type.

2. The method of claim 1, wherein the classifying includes recreating an environment of the destination system at the source system by at least accessing an object versioning database including data characterizing versions of objects at the destination system.

3. The method of claim 2, wherein the classifying further includes determining that the second software object has not previously been transported to the destination system and, in response, determining the dependency to be the hard dependency type.

4. The method of claim 1, wherein the classifying the first dependency is performed at least using a binary predictive model.

5. The method of claim 1, wherein the determining the dependency type is utilized to train a binary predictive model.

6. The method of claim 1, wherein the destination system includes a database management test system for modification and testing of software objects;
   wherein the source system includes a database management development system for developing software objects;
   wherein the request includes a data packet including a plurality of modified software objects, which when received by the destination system, causes the destination system to replace existing software objects with corresponding modified software objects contained in the request.

7. The method of claim 1, wherein the first dependency characterizes that operation of the second software object is affected by the modified first software object.

8. The method of claim 1, wherein determining the first dependency includes determining that the second software object is referred to by the modified first software object.

9. The method of claim 1, wherein the determining the dependency and the identifying the inconsistency is performed prior to release of the request by the source system.

10. A system comprising:
   at least one data processor; and
   memory storing instructions which, when executed by the at least one data processor, causes the at least one data processor to perform operations comprising:
      receiving, at a source system, data characterizing a modified first software object for transport to a destination system via a request and to update a first software object deployed on the destination system;
      determining, by the source system, a first dependency of the modified first software object on a second software object;
      identifying, by the source system and using the first dependency, an inconsistency between the modified first software object and the second software object, the identifying including determining that the inconsistency would occur at the destination system if the modified first software object is transported to the destination system, the destination system different than the source system; and
      providing data indicative of the inconsistency,
   wherein the identifying the inconsistency includes:
      classifying the first dependency as a hard dependency type or a soft dependency type, the hard dependency type indicative of an inconsistency between the modified first software object and the second software object at the destination system, and the soft dependency type indicative of consistency between the modified first software object and the second software object at the destination system;
      wherein the classifying includes:
         determining that the modified first software object depends upon itself; and
         classifying the first dependency as the hard dependency type.

11. The system of claim 10, wherein the classifying includes recreating an environment of the destination system at the source system by at least accessing an object versioning database including data characterizing versions of objects at the destination system.

12. The system of claim 11, wherein the classifying further includes determining that the second software object has not previously been transported to the destination system and, in response, determining the dependency to be the hard dependency type.

13. The system of claim 10, wherein the classifying the first dependency is performed at least using a binary predictive model.

14. The system of claim 10, wherein the determining the dependency type is utilized to train a binary predictive model.

15. The system of claim 10, wherein the destination system includes a database management test system for modification and testing of software objects;
   wherein the source system includes a database management development system for developing software objects;
   wherein the request includes a data packet including a plurality of modified software objects, which when received by the destination system, causes the destination system to replace existing software objects with corresponding modified software objects contained in the request.

16. A non-transitory computer readable medium storing instructions, which when executed by at least one data processor forming part of at least one computing system causes the at least one data processor to perform operations comprising:
   receiving, at a source system, data characterizing a modified first software object for transport to a destination system via a request and to update a first software object deployed on the destination system;
   determining, by the source system, a first dependency of the modified first software object on a second software object;
   identifying, by the source system and using the first dependency, an inconsistency between the modified first software object and the second software object, the identifying including determining that the inconsistency would occur at the destination system if the modified first software object is transported to the destination system, the destination system different than the source system; and
   providing data indicative of the inconsistency,
   wherein the identifying the inconsistency includes:
      classifying the first dependency as a hard dependency type or a soft dependency type, the hard dependency type indicative of an inconsistency between the modified first software object and the second software object at the destination system, and the soft dependency type indicative of consistency between the modified first software object and the second software object at the destination system;
   wherein the classifying includes:
      determining that the modified first software object depends upon itself; and
      classifying the first dependency as the hard dependency type.

* * * * *